United States Patent
Bae

(10) Patent No.: US 12,280,516 B2
(45) Date of Patent: Apr. 22, 2025

(54) OPTICAL FIBER PROCESSING APPARATUS

(71) Applicant: Suk Man Bae, Yongin-si (KR)

(72) Inventor: Suk Man Bae, Yongin-si (KR)

( * ) Notice: Subject to any disclaimer, the term of this patent is extended or adjusted under 35 U.S.C. 154(b) by 823 days.

(21) Appl. No.: 17/310,285

(22) PCT Filed: Jan. 28, 2020

(86) PCT No.: PCT/KR2020/001273
§ 371 (c)(1),
(2) Date: Jul. 27, 2021

(87) PCT Pub. No.: WO2020/159187
PCT Pub. Date: Aug. 6, 2020

(65) Prior Publication Data
US 2022/0072731 A1  Mar. 10, 2022

(30) Foreign Application Priority Data
Jan. 29, 2019  (KR) .......................... 10-2019-0011310

(51) Int. Cl.
G02B 6/02 (2006.01)
B26F 1/38 (2006.01)
B32B 38/10 (2006.01)

(52) U.S. Cl.
CPC ............ B26F 1/3846 (2013.01); B32B 38/10 (2013.01); G02B 6/02309 (2013.01)

(58) Field of Classification Search
None
See application file for complete search history.

(56) References Cited

U.S. PATENT DOCUMENTS

| | | | | |
|---|---|---|---|---|
| 4,203,539 A | * | 5/1980 | Miller | G02B 6/25 225/2 |
| 4,564,736 A | * | 1/1986 | Jones | B23K 26/06 385/127 |
| 5,425,039 A | * | 6/1995 | Hsu | H01S 3/067 372/99 |
| 5,460,026 A | * | 10/1995 | Schafer | B21D 28/28 83/54 |

(Continued)

FOREIGN PATENT DOCUMENTS

| | | |
|---|---|---|
| JP | 2000233937 A | 8/2000 |
| KR | 20050081156 A | 8/2005 |

(Continued)

OTHER PUBLICATIONS

International Search Report (PCT/ISA/210) with translation and Written Opinion (PCT/ISA/237) mailed on May 7, 2020, by the Korean Patent Office as the International Searching Authority for International Application No. PCT/KR2020/001273.

Primary Examiner — Jodi C Franklin
(74) Attorney, Agent, or Firm — Panitch Schwarze Belisario & Nadel LLP

(57) ABSTRACT

Disclosed is an optical fiber processing apparatus comprising: an optical fiber machining head provided with a fiber proceeding tunnel, through which an optical fiber passes, and a plurality of processing rod insertion holes formed in the circumference of the proceeding tunnel in a direction perpendicular to the tunnel; a processing rod having a machining tip for processing the optical fiber in the proceeding tunnel through the processing rod insertion hole; and an actuator operating a processing drill.

16 Claims, 12 Drawing Sheets

(56) References Cited

U.S. PATENT DOCUMENTS

| | | | | |
|---|---|---|---|---|
| 5,550,629 | A * | 8/1996 | Shapanus | G01R 31/346 356/300 |
| 5,816,089 | A * | 10/1998 | Marando | B21D 28/28 83/54 |
| 6,067,830 | A * | 5/2000 | Klages | B21D 26/035 72/336 |
| 6,205,901 | B1 * | 3/2001 | Knutson | B26D 7/2614 83/633 |
| 7,021,098 | B2 * | 4/2006 | Griskiewitz | B21D 28/28 83/53 |
| 7,462,402 | B2 * | 12/2008 | Coelho | B21D 31/02 428/603 |
| 9,067,252 | B2 * | 6/2015 | Christianson | B21D 26/035 |
| 9,151,917 | B2 * | 10/2015 | Lee | G02B 6/4239 |
| 10,605,990 | B2 * | 3/2020 | Vallance | B26F 3/002 |
| 10,656,335 | B2 * | 5/2020 | Zheng | G02B 6/25 |
| 11,036,007 | B2 * | 6/2021 | Gonthier | G02B 6/25 |
| 2003/0196533 | A1 | 10/2003 | Tabeling | G02B 6/25 83/679 |
| 2004/0264831 | A1 * | 12/2004 | Leppert | G01M 3/38 385/12 |
| 2005/0016237 | A1 * | 1/2005 | Griskiewitz | B21D 26/035 72/55 |
| 2005/0152650 | A1 * | 7/2005 | Knickerbocker | G02B 6/3885 385/60 |
| 2005/0276669 | A1 * | 12/2005 | Pottorff | B26F 1/16 408/97 |
| 2007/0172191 | A1 | 7/2007 | Song | |
| 2008/0236350 | A1 * | 10/2008 | Liu | B21D 28/32 428/597 |
| 2010/0269652 | A1 * | 10/2010 | Becker | B26D 7/0633 83/30 |
| 2013/0204142 | A1 * | 8/2013 | Bertholds | A61B 90/06 600/478 |
| 2013/0284041 | A1 * | 10/2013 | Koberg | G03F 7/24 101/481 |
| 2013/0301982 | A1 * | 11/2013 | Lee | G02B 6/4206 29/829 |
| 2014/0083273 | A1 * | 3/2014 | Vallance | B26D 3/08 30/96 |
| 2016/0151873 | A1 * | 6/2016 | Richt | B25H 1/0092 33/286 |
| 2016/0221118 | A1 * | 8/2016 | Yamashita | B23K 26/0608 |
| 2016/0236259 | A1 * | 8/2016 | Stojkovic | B23P 19/064 |
| 2017/0144320 | A1 * | 5/2017 | Kundracik | B26D 5/12 |
| 2017/0191314 | A1 * | 7/2017 | Faircloth | E21B 37/00 |
| 2017/0261192 | A1 * | 9/2017 | Kitaoka | G02B 6/354 |
| 2018/0002217 | A1 * | 1/2018 | Boughton | C03B 37/014 |
| 2018/0026415 | A1 * | 1/2018 | Daniel | H01S 3/06733 372/6 |
| 2018/0119927 | A1 * | 5/2018 | Warren, II | F21V 1/08 |
| 2018/0163477 | A1 * | 6/2018 | Faircloth | H01S 5/042 |
| 2018/0180813 | A1 * | 6/2018 | Gross | G02B 6/255 |
| 2018/0275048 | A1 * | 9/2018 | Das | G02B 6/4248 |

FOREIGN PATENT DOCUMENTS

| | | |
|---|---|---|
| KR | 20090071001 A | 7/2009 |
| KR | 20150043773 A | 4/2015 |
| KR | 20150058360 A | 5/2015 |
| KR | 20180098310 A | 9/2018 |
| WO | 2014047226 A1 | 3/2014 |
| WO | 2017108060 A1 | 6/2017 |

* cited by examiner

OPTICAL FIBER PROCESSING APPARATUS

TECHNICAL FIELD

The present disclosure relates to an optical fiber processing apparatus, and more particularly, to an apparatus for forming a window outputting light on an outer face of the optical fiber.

BACKGROUND ART

A fiber-type optical fiber including a core where light proceeds and a clad surrounding the core, is an optical device configured to transmit or provide light, and may be used not only for light transmission but as an apparatus for solar power generation, a display, or a light application device, such as a back light, etc.

The light incidence on the optical fiber may be performed through a facet of one side of the core, and the light output may be performed through a facet of another end or an outer circumference surface where the clad covering the core is formed. The light emission through the facet is in accordance with the conventional optical waveguide structure, and the light output through the outer circumference surface may be used for solar power generation, display, etc. The window formed on the outer circumference surface of the optical fiber may be provided by an opening formed at the clad.

Forming windows at a clad of an optical fiber is quite difficult, and depends on general machining, which results in long processing time.

DESCRIPTION OF EMBODIMENTS

Technical Problem

The disclosed device is intended for quickly and accurately forming a window at a clad of an optical fiber.

Solution to Problem

According to an aspect of the present disclosure,
an optical fiber processing apparatus includes:
an optical fiber machining head provided with an optical fiber proceeding tunnel, through which an optical fiber passes, and a plurality of processing rod insertion holes for optical fiber processing formed in the circumference of the tunnel;
a processing rod having a machining tip for processing the optical fiber in the proceeding tunnel through the processing rod insertion hole; and
an actuator operating the processing rod.

According to one or more embodiments, the processing rods may be arranged in a misaligned manner with respect to each other, centering around the tunnel.

According to one or more embodiments, a plurality of spacers allowing a gap between an inner side of the tunnel and the optical fiber and supporting the optical fiber may be formed around the optical fiber inside the tunnel.

According to one or more embodiments, a bushing covering the optical fiber may be arranged inside the tunnel, and the plurality of spacers may be formed inside the bushing.

According to one or more embodiments, refrigerants for cooling the optical fiber may be injected into a gap formed by the spacers.

According to one or more embodiments, a sensing tube for mechanically detecting a processing depth by the processing rod may be arranged on the processing rod.

According to one or more embodiments, the machining head may include a head core providing a tunnel through which the optical fiber passes, and a head body supporting the head core.

According to one or more embodiments, a bushing through which the optical fiber passes may be arranged at the head core, and a plurality of spacers supporting the optical fiber may be formed inside the bushing.

According to one or more embodiments, a coolant passing hole into which solvents from the outside are flowed and the processing rode insertion hole may be provided at the head body, and the coolant passing hole may be connected to the processing rod insertion hole, allowing the coolant to flow into the bushing through the processing rod insertion hole.

According to one or more embodiments, the actuator may include a stator frame of which a relative location is fixed with respect to the machining head, a moving frame reciprocating linearly with respect to the stator frame, and a motor arranged at the moving frame and rotating the processing rod with high speed.

MODE OF DISCLOSURE

Figure 1:
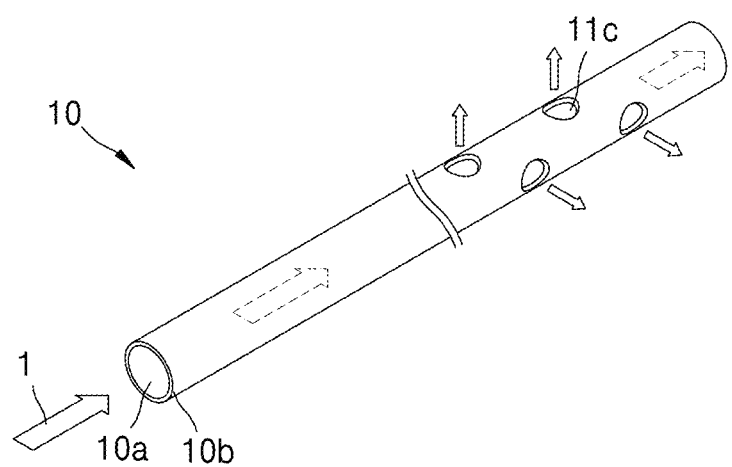
FIG. 1 schematically illustrates an optical fiber processed by an optical fiber processing apparatus according to one or more embodiments.

Hereinafter, preferred embodiments of the present disclosure will be described in detail with reference to the accompanying drawings. Embodiments may, however, be embodied in many different forms and should not be construed as being limited to the embodiments set forth herein; rather, these embodiments are provided so that this disclosure will be thorough and complete, and will fully convey the concept of embodiments to those skilled in the art. Like reference numerals in the drawings denote like elements. Furthermore, various elements and areas in the drawings are schematically drawn. Thus, the concept of the present disclosure is not limited by relative sizes or distances illustrated in the accompanying drawings.

While such terms as "first," "second," etc., may be used to describe various components, such components must not be limited to the above terms. The above terms are used only to distinguish one component from another. For example, a first component may be named as a second component, and in contrast, a second component may be named as a first component within the scope of the technical concept of the present disclosure.

The terms used in the present specification are merely used to describe exemplary embodiments, and are not intended to limit embodiments. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, every terms used herein including technical terms and scientific terms, have the same meaning as commonly understood by a person skilled in the art to which the present technical concept pertains. Further, the general terms defined by dictionaries shall be understood as having a meaning consistent with what such terms mean in the context of related technologies, and shall not be interpreted as excessively formal terms unless explicitly defined.

When a certain embodiment may be implemented differently, a specific process order may be performed differently from the described order. For example, two consecutively described processes may be performed substantially at the same time or performed in an order opposite to the described order.

In the attached drawings, for example, according to a manufacturing technology and/or tolerance, modifications of the illustrated forms may be expected. Accordingly, embodiments of the present disclosure shall not be limited by specific forms illustrated in the drawings, and shall encompass modifications of forms caused by, for example, a manufacturing process. The term "and/or" has been used herein to include each mentioned component and all combinations of such components. The term "substrate" used in this specification may refer to a substrate itself, or a stacked structure including a substrate and a layer or a film, etc. formed on the substrate. Further, the term "surface of a substrate" used in this specification may refer to an exposed surface of the substrate itself, or an outer surface such as a layer, film, etc. formed on the substrate. Also, when a component is "on top of" or "on" another component, it should be construed that a component may be directly on and in contact with another component, or may be on another component in a noncontact manner.

Figure 2:
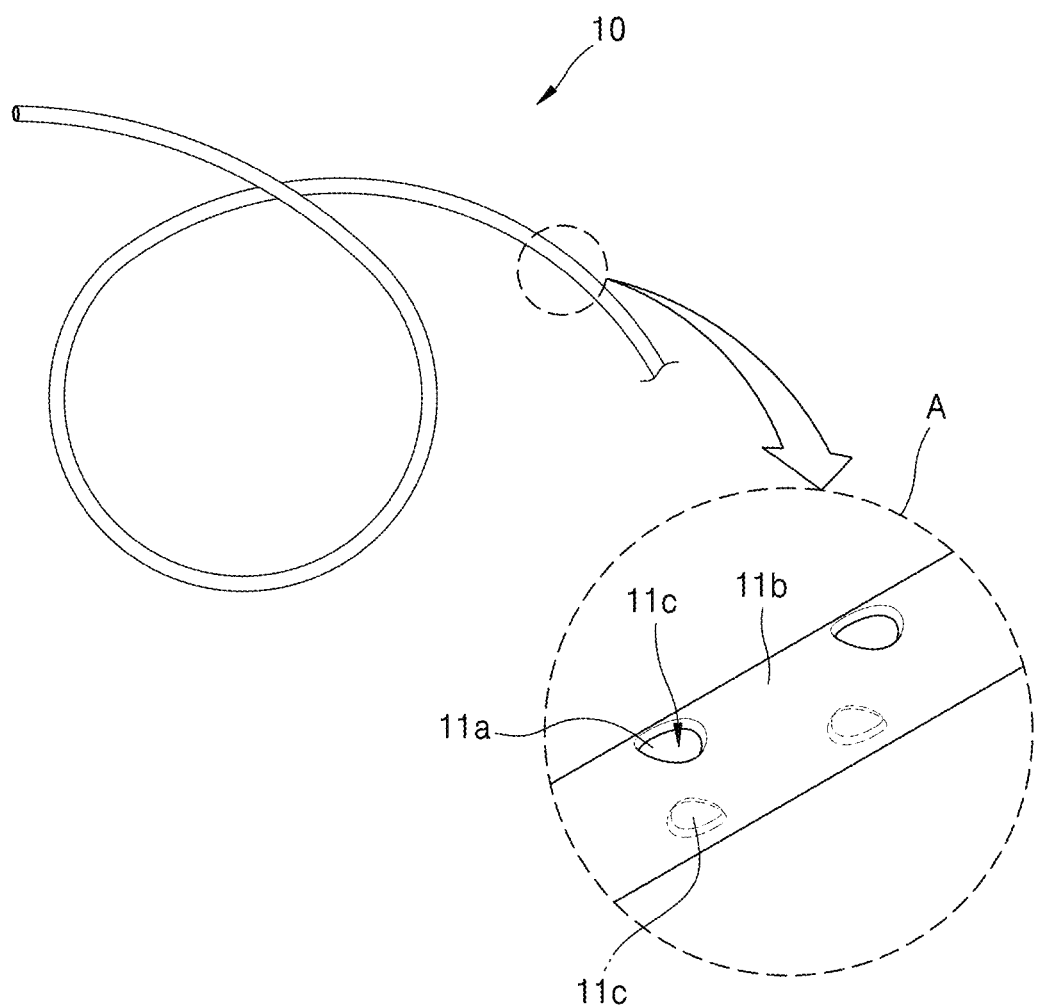
FIG. 2 illustrates in detail the optical fiber of FIG. 1.

FIG. 1 schematically illustrates an optical fiber processed by an optical fiber processing apparatus according to one or more embodiments, and FIG. 2 illustrates in detail the optical fiber of FIG. 1.

As illustrated in FIGS. 1 and 2, the optical fiber 10 may include a core 10a through which light 1 proceeds and a clad 10b covering an outer circumference surface of the core 10a. A plurality of light output windows 10c through which the light proceeding inside the core 10a is output may be formed at the clad 10b in a longitudinal direction of the optical fiber.

The light 1 may be injected into the core 10a through one side area or a facet of the optical fiber 10, and the light 1 injected into the core 10a may proceed along the core 10a to meet the light output window 11c at which time part of the light 1 may be output through the light output window 11c to the outside of the optical fiber 10.

The light output windows 10c may be openings formed by partially removing the clad 10b covering the core 10a, and light output area through which part of the light proceeding along the core 10a may be output.

Figure 3:
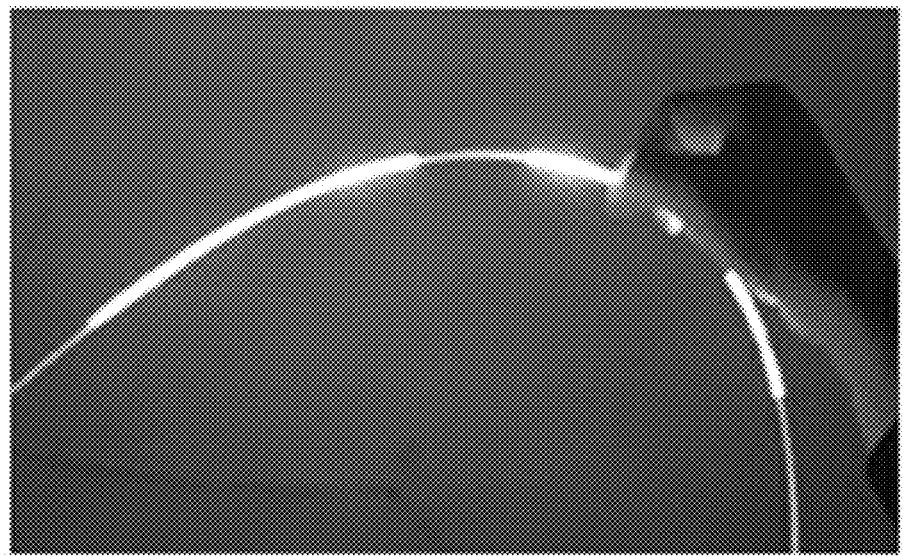
FIG. 3 is an actual photograph of an optical fiber having light output windows.

FIG. 3 is an actual photograph of the optical fiber 10 having the light output windows 10c.

As illustrated in FIG. 3, the optical fiber 10 may function as a fibrous luminous body emitting light partially or entirely. Such optical fiber 10 may be used as a light source in various forms, such as, a dimming, lighting, or displaying system for vehicles, a light source for greenhouses, particularly for smart farms, a display device, a solar power generator, etc., and the usage of the optical fiber may be further extended.

Figure 4:
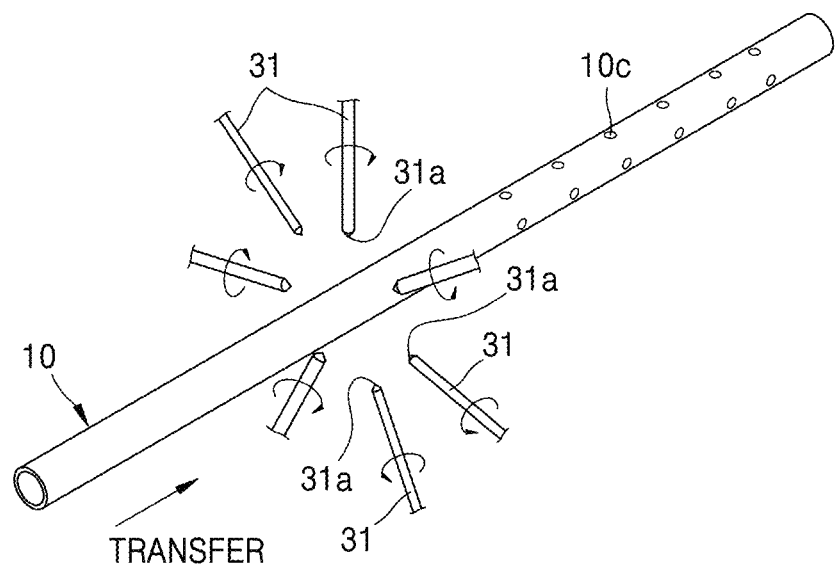
FIGS. 4 and 5 illustrate a structure of forming light output windows at an optical fiber according one or more embodiments.
Figure 5:
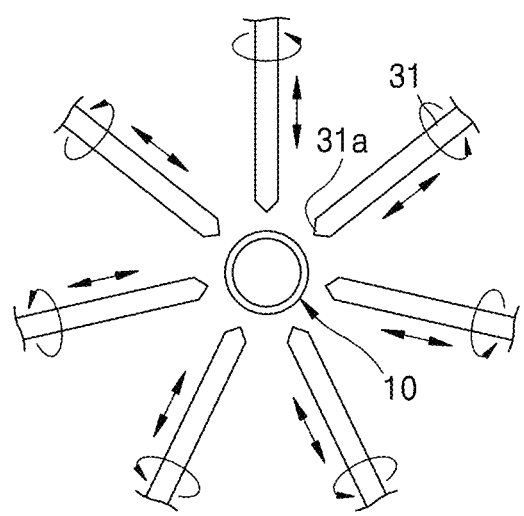

FIGS. 4 and 5 illustrate a structure of forming light output windows at an optical fiber according one or more embodiments.

As illustrated in FIGS. 4 and 5, the processing rods 31 may be arranged with a certain angular distance therebetween in a direction perpendicular to a proceeding direction of the optical fiber around the optical fiber 10 transferred in one direction. The optical fiber 10 may be transferred intermittently by certain spacing interval according to gradual formation of the light output windows 10c at the optical fiber 10.

The processing rod 31 may be arranged to be able to rotate with a high speed and move forward and backward, and at its end, a machining tip 31a for cutting the clad 10b of the optical fiber 10 may be formed. The processing rod 31 may form through holes, i.e., the light output windows 10c at the clad 10b by high speed rotation.

The processing rods 31 may be arranged centering around the optical fiber 10 at its circumference with certain angular distance between each other, and after a first proceeding (approaching) to the optical fiber 10, the machining tip 31a may contact with the clad 10b of the optical fiber 10, and the processing of the light output window 10c may be performed on the clad 10b by a second proceeding. A distance of the first proceeding may correspond to a thickness value of the clad 10b, and accordingly, a distance of the second proceeding may be very short. The distance of the second processing may be properly adjusted according to a result of the processing on the clad 10b. Here, following the first proceeding, the second proceeding may be initiated after the machining tip 31a contacts with the clad 10b, and the distance may be calculated from a position of the machining tip 31a at a time point of contact. This is to form the light output windows 10c with an accurate thickness at the clad 10b regardless of mechanical errors inherent in arrangement of the processing rods 31.

As an additional device to this end, when the machining tip 31a proceeds to contact with the clad 10b, a mechanical structure or an electric electron interrupter configured to mechanically, or electrically/electronically detect such contact may be provided to control a processing depth, thereby performing the processing of the light output window 10c within certain distance after the contact with the clad 10b. Alternatively, after the commencement of the processing of the light output window 10c on the clad 10b, by mechanically or electronically detecting the depth thereof, the light output window 10c at the clad 10b may be processed precisely. In the process of processing the light output window 10d through mechanical cutting by the processing rod 31, the core inside the clad 10b may also be partially cut, and the depth of the part of the core cut by the processing rod 31 according to the processing depth control described above may be adjusted to a constant or desired depth.

Figure 6:
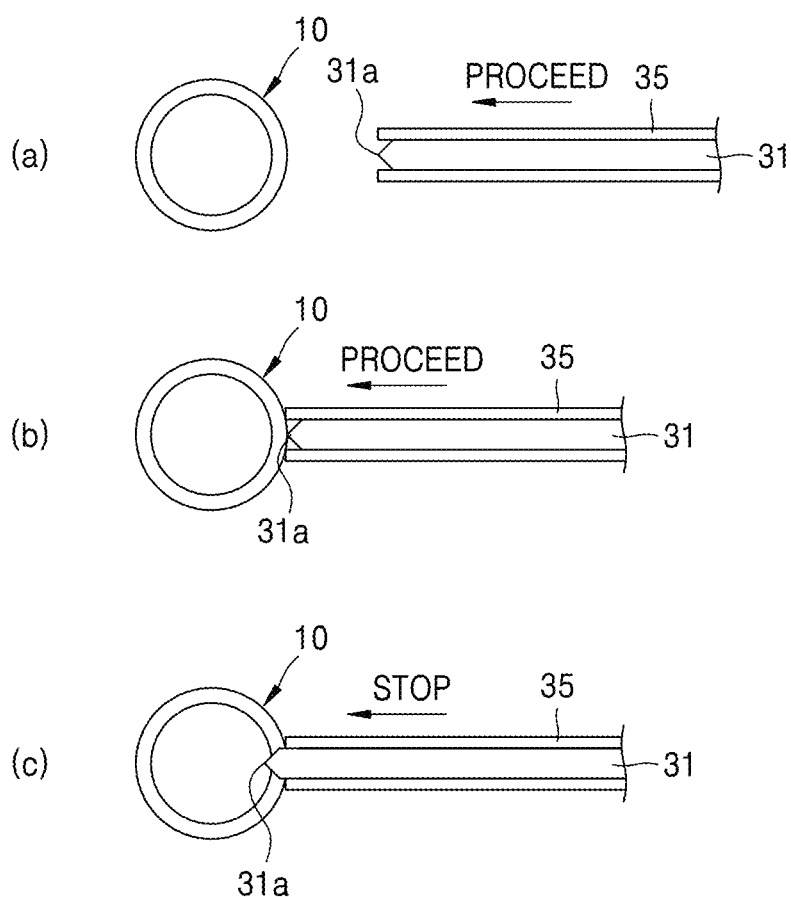
FIG. 6 illustrates operations of a sensing tube arranged near a machining tip of a fore-end of a processing rod of an optical fiber processing apparatus according to one or more embodiments.

FIG. 6 illustrates the technical concept of arranging the sensing tube 35 near the machining tip 31a of the fore-end of the processing rod 31 and stopping the processing when the sensing tube 35 is moved backward from the machining tip 31a.

As illustrated in A of FIG. 6, the sensing tube 35 may be arranged so that the fore-end thereof is in line with the tip of the machining tip 31a in a normal state. In this state, when the processing rod 31 moves forward, the sensing tube 35 may also move.

As illustrated in B of FIG. 6, the processing rod 31 moves forward to bring its tip into contact with the clad 10b of the optical fiber 10, thereby initiating the processing of the light output window.

As illustrated in C of FIG. 6, as the processing of the light output window proceeds, the sensing tube 35 arranged at the fore-end of the processing rod 31 may be pushed by the clad 10b and move backward of the processing rod 31. At this time, when the distance by which the sensing tube 35 has moved backward reaches a preset value, the processing of the light output window 10c by the processing rod 31 may be suspended. The suspension of the processing may include suspension of moving backward and rotating of the processing rod 31. Here, measurement of a preset value may be carried out by detecting a distance by which the sensing tube has moved backward with respect to the processing rod 31, and accordingly, the sensing tube may be connected to an additional device for measuring the distance.

Figure 7:
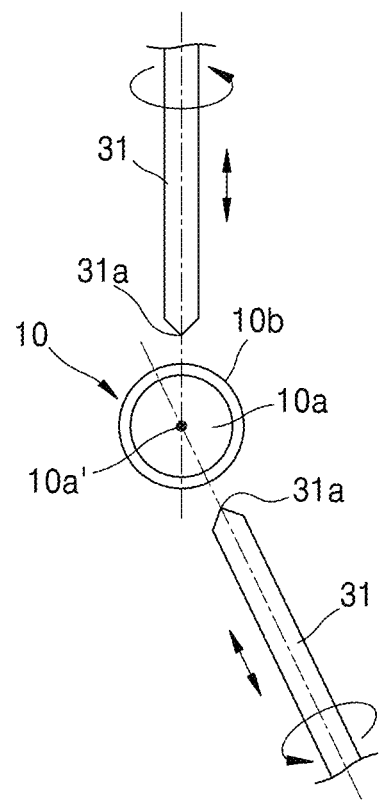
FIG. 7 illustrates arrangement of light output windows around a core of an optical fiber, formed by an optical fiber processing apparatus.

FIG. 7 illustrates arrangement of the light output windows formed around the core. As illustrated in FIGS. 7 and 5, as the processing rods 31 forming the light output window 10c may be arranged centering around the core 10a in a mis-aligned manner avoiding facing each other, two light output windows 10c arranged centering around a center point 10a' of the core 10a to face each other may not be on the same line.

In the process of forming the light output window 10c, processing the bottom surface of the light output window 10c according to mechanical processing, i.e., a cutting area of the surface of the core 10a exposed at the bottom of the light output window 10c to be smooth may be beneficial for suppression of light loss. To this end, by processing the optical fiber 10 at a low temperature or a temperature below zero, i.e., performing a cold cutting processing, a smooth cutting surface may be obtained. As for the low temperature processing, maintaining the processing space at a low temperature may be helpful, and further, by providing nitrogen gas in cooled condition locally, the optical fiber 10 may be quenched.

Figure 8:
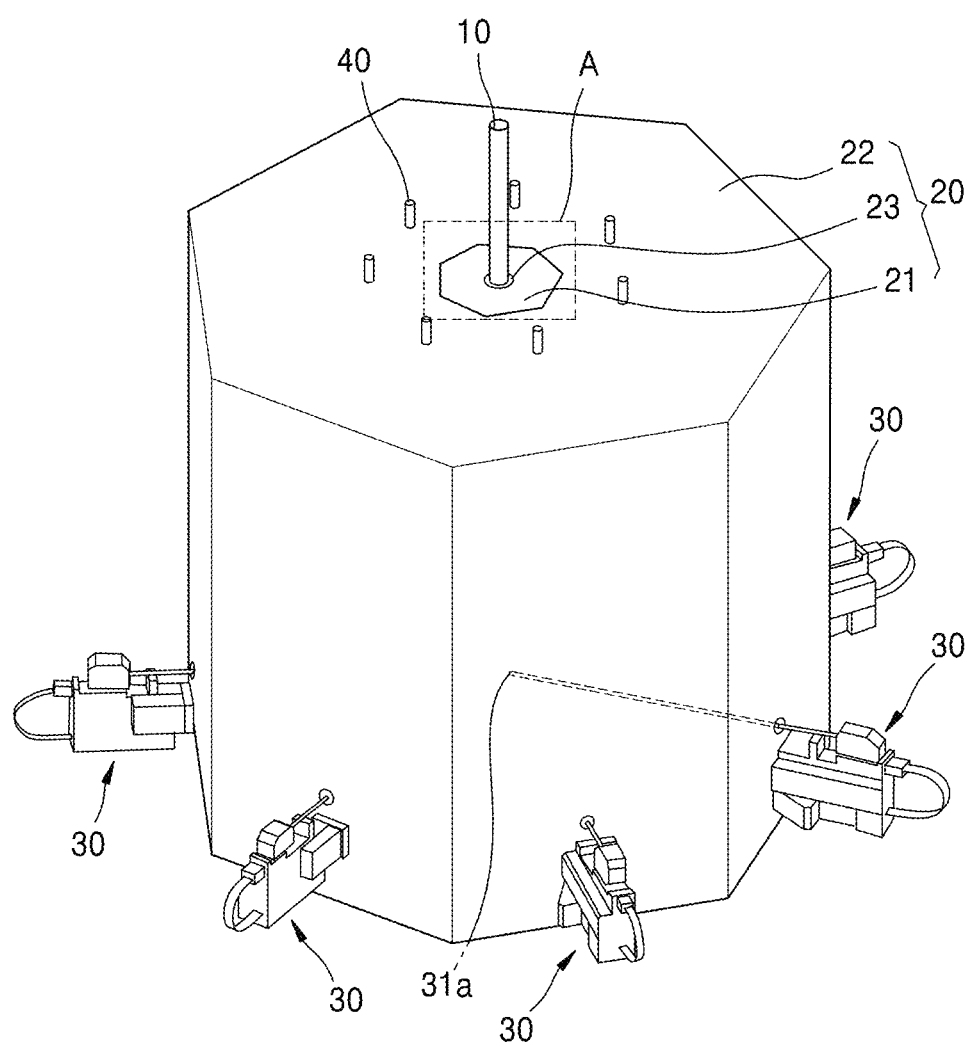
FIG. 8 is a perspective view of a schematic exterior of an optical fiber processing apparatus according to one or more embodiments.
Figure 9:
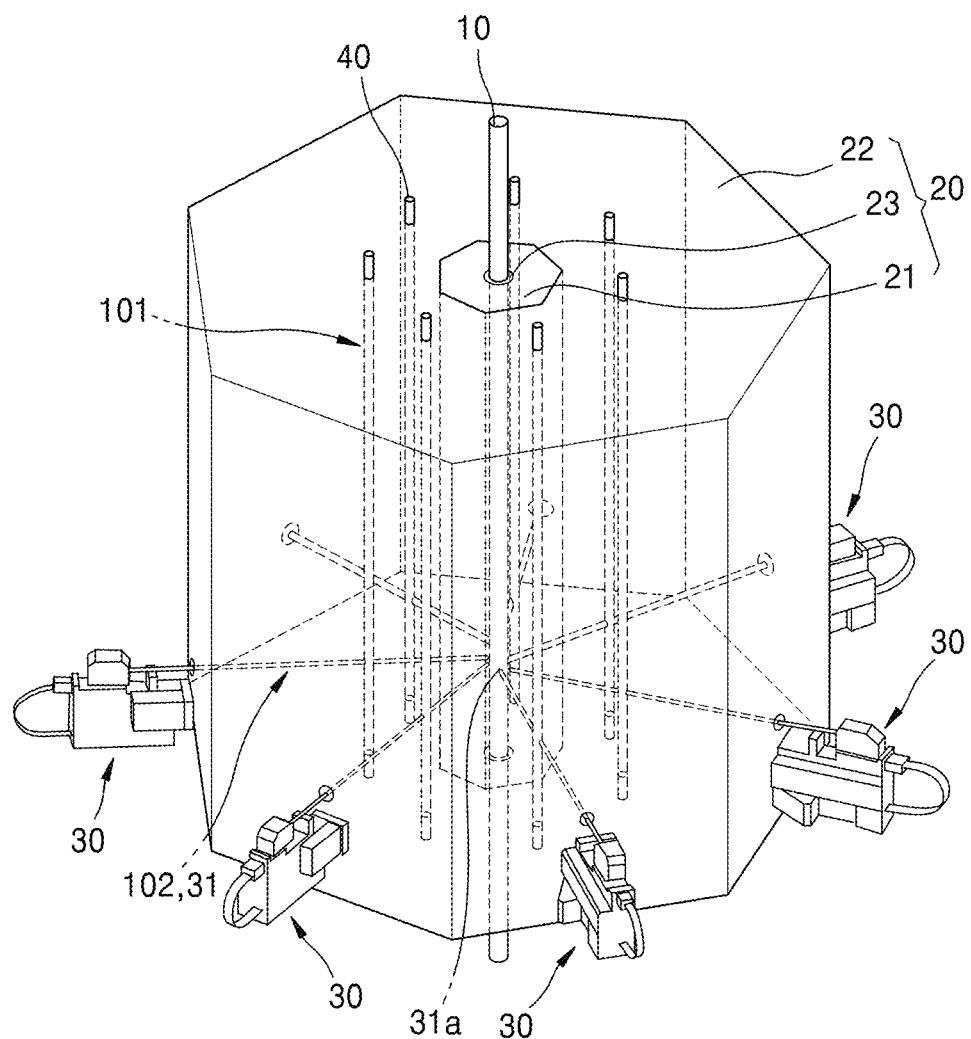
FIG. 9 is a projective diagram of a schematic interior of an optical fiber processing apparatus according to one or more embodiments.
Figure 10:
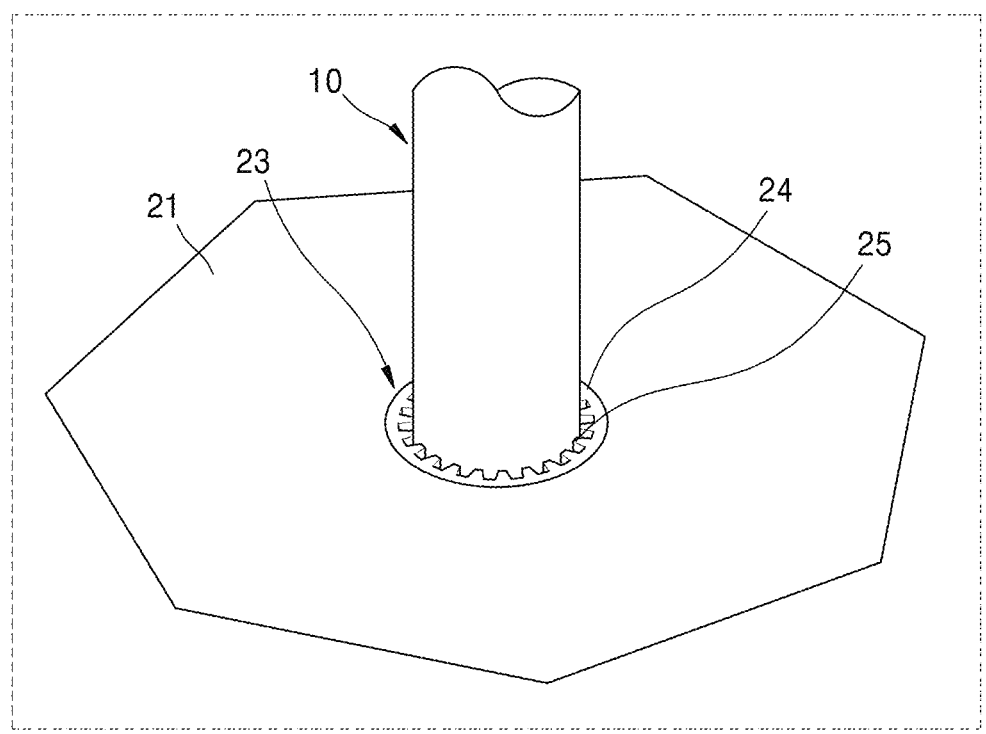
FIG. 10 is a partial enlarged view of a fiber proceeding tunnel through which an optical fiber passes in an optical fiber processing apparatus according to one or more embodiments.

FIGS. 8 and 9 are a perspective view and a projective diagram of a schematic exterior of an optical fiber processing apparatus according to one or more embodiments, respectively, and FIG. 10 is a partial enlarged view of a fiber proceeding tunnel through which an optical fiber passes.

The optical fiber illustrated in FIGS. 8 and 9 may include the fiber proceeding tunnel 23 where formation of light output window 10c at the clad 10b of the optical fiber 10 passing therethrough is performed, and an optical fiber machining head 20 provided with a plurality of processing rod insertion holes 102 formed radially to be connected with the tunnel 23 on the circumference of the tunnel 23 in a direction perpendicular to the tunnel 23.

On the circumference of the machining head 20, the processing rod 31 having the machining tip 31a for processing the surface of the optical fiber (i.e., the clad) inside the proceeding tunnel through the processing rod insertion hole 102, and an actuator 30 operating the processing rod may be arranged. The actuator 30 may be a micro-drill capable of processing a very small hole.

The machining head 20 may include a head core 21 having the tunnel 23 through which the optical fiber 10 passes and a head body 22 supporting the head core 21. However, according to another embodiment, the tunnel 23 may be formed on the head body 22 without the head core 21. That is, the machining head 20 may include the head body 22 and the head core 21 constituting a single body.

In addition, a coolant passing hole 101 intersecting the processing rod insertion hole 102 may be formed at the head body 22. The coolant passing hole 101 is for cooling the head body 22 and the optical fiber 10 and is optional. The refrigerant in gaseous or liquid state injected through a nipple 40 combined with the head body 22 may flow into the optical fiber proceeding tunnel 23 through the processing rod insertion hole 102, and after flowing into the tunnel 24 through a gap formed by a spacer described below, it will be discharged.

The machining head may have an internal structure in which the processing rod insertion holes 102 arranged radially around the tunnel 23 through which the optical fiber passes are connected with the coolant passing hole 101 formed intersecting or perpendicular to the processing rod insertion hole.

Further, the actuators arranged radially around the tunnel 23 may not be placed on the same line based on the core 10a of the optical fiber 10 or the tunnel 23. This is intended to suppress light loss or light output mal-uniform caused when the light output windows 10c formed at the optical fiber face each other. That is, in the embodiment of FIG. 13, the seven actuators 30 are arranged at equal angles, and accordingly, all actuators 30 are formed in a misaligned manner with respect to each other, centering around the tunnel.

As illustrated in FIG. 10, a cylindrical bushing 24 through which the optical fiber 10 passes may be provided at the head core 21 arranged at the head body 22. A plurality of spacers 25 which are in contact with and support the optical fiber 10 may be formed inside the bushing 24. The plurality of spacers 25 may be arranged with certain distance to reduce friction between a core cylinder 23 and the optical fiber 10 while supporting the optical fiber 10. Due to such arrangement of the spacers 25, a refrigerant inflow space for cold processing may be formed.

The spacers 25 may be placed with certain distance inside the bushing 24 forming a gear type spacing structure, and each spacer 25 may be extended in an extension direction or proceeding direction of the optical fiber 10.

According to another embodiment, the spacers 25 formed inside the bushing 24 may be formed directly in the tunnel 23 formed at the head core 21.

Figure 11:
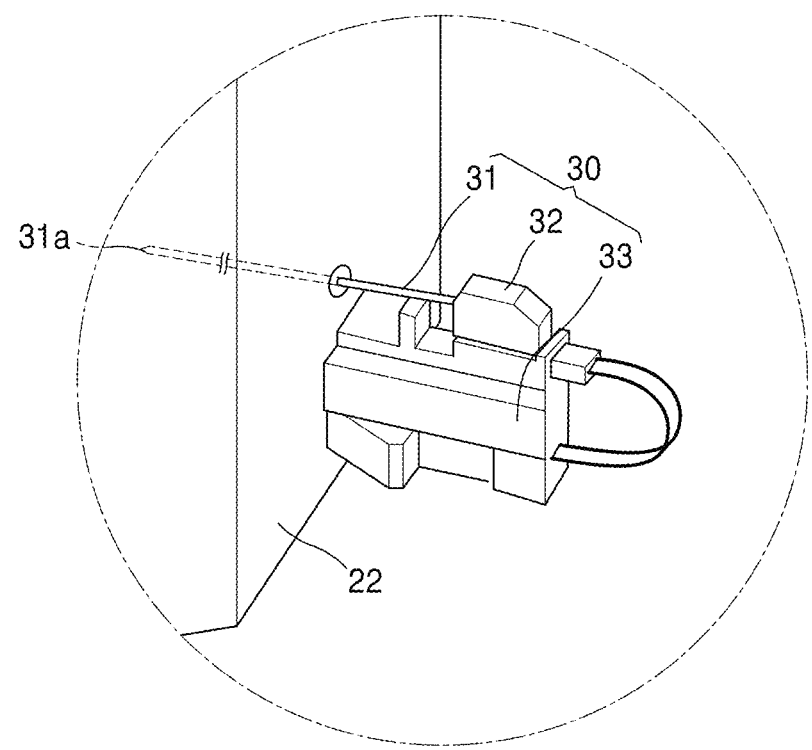
FIGS. 11 and 12 illustrate installation state of an actuator operating a processing rod in an optical fiber processing apparatus according to one or more embodiments.
Figure 12:
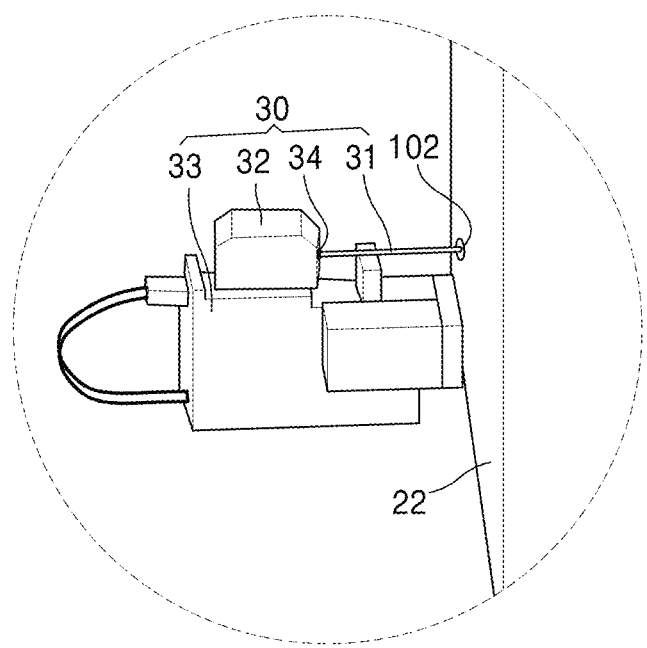

FIGS. 11 and 12 illustrate installation state of an actuator 30 operating a processing rod 31.

The actuator 30 may include a body of the machining head 20, a stator frame 33 fixed to the outer circumference surface of the head body 22 according to the embodiment, a moving frame 32 reciprocating linearly with respect to the stator frame, and a motor 34 arranged at the moving frame and rotating the processing rod 31 with high speed. The relative location of the stator frame 33 may be fixed with respect to the machining head 20, and according to the embodiment, the stator frame 33 may be fixed to the machining head 20.

The movement of the moving frame 32 may cause a reciprocating motion for the processing rod insertion hole 102 of the head body 22 equipped with the processing rod 31, and accordingly, the machining tip 31a of the processing rod 31 rotating with high speed may contact with the clad 10b of the optical fiber 10 and perform the processing of the light output window 10c at the clad 10b. The machining tip 31a may be formed of an artificial or natural diamond. According to the processing of the light output window 10c, when the clad 10c exposed at the bottom of the light output window 10c is also cut by a certain depth, such depth may be controlled by the cutting depth adjustment structure mentioned above.

According to the present disclosure, a large amount of optical fibers allowing light to output through a lateral side for use in various fields including solar power generation, space engineering, large vessels, electric vehicles, portable electrical appliances, etc. may be manufactured.

Although specific embodiments have been illustrated and described herein, a person skilled in the art may easily understand that the present disclosure may be modified or changed in various ways to the extent that such modifications or changes are within the technical ideas or field of the present disclosure.

The invention claimed is:

1. An optical fiber processing apparatus for forming light output windows in an optical fiber having a core and a clad surrounding the core, comprising:
   an optical fiber machining head including a head core with an optical fiber proceeding tunnel through which the optical fiber passes, a head body supporting the head core, a coolant passing hole formed in the head body and fluidly connected to the proceeding tunnel of the head core, and a plurality of processing rod insertion holes provided in the head body for optical fiber processing formed in the circumference of the tunnel;
   a plurality of rotational processing rods, each having a machining tip configured to form cutting areas in the clad of the optical fiber to form the light output windows around the core of the optical fiber thereby exposing the surface of the core at a bottom of the light output windows, in the proceeding tunnel through the processing rod insertion hole; and
   a plurality of actuators, each configured to reciprocate and rotate the respective processing rod having the machining tip to thereby form the cutting areas as the light output windows.

2. The optical fiber processing apparatus of claim 1, wherein the plurality of processing rods are arranged centering around the tunnel in a misaligned manner with respect to each other.

3. The optical fiber processing apparatus of claim 2, wherein the actuator includes a stator frame of which a relative location is fixed with respect to the machining head, a moving frame reciprocating linearly with respect to the stator frame, and a motor arranged at the moving frame and rotating the processing rod.

4. The optical fiber processing apparatus of claim 1, wherein a plurality of spacers allowing a gap between an inner side of the tunnel and the optical fiber and supporting the optical fiber are formed around the optical fiber inside the tunnel.

5. The optical fiber processing apparatus of claim 4, wherein a bushing covering the optical fiber is arranged inside the tunnel, and the plurality of spacers are formed inside the bushing.

6. The optical fiber processing apparatus of claim 5, wherein refrigerants for cooling the optical fiber are injected into a gap formed by the plurality of spacers.

7. The optical fiber processing apparatus of claim 5, wherein the actuator includes a stator frame of which a relative location is fixed with respect to the machining head, a moving frame reciprocating linearly with respect to the stator frame, and a motor arranged at the moving frame and rotating the processing rod.

8. The optical fiber processing apparatus of claim 6, wherein the actuator includes a stator frame of which a relative location is fixed with respect to the machining head, a moving frame reciprocating linearly with respect to the stator frame, and a motor arranged at the moving frame and rotating the processing rod.

9. The optical fiber processing apparatus of claim 4, wherein the actuator includes a stator frame of which a relative location is fixed with respect to the machining head, a moving frame reciprocating linearly with respect to the stator frame, and a motor arranged at the moving frame and rotating the processing rod.

10. The optical fiber processing apparatus of claim 1, wherein a sensing tube configured to mechanically detect a processing depth for the optical fiber by bring a fore-end of the processing rod into contact with the optical fiber is arranged on the processing rod.

11. The optical fiber processing apparatus of claim 10, wherein the actuator includes a stator frame of which a relative location is fixed with respect to the machining head, a moving frame reciprocating linearly with respect to the stator frame, and a motor arranged at the moving frame and rotating the processing rod.

12. The optical fiber processing apparatus of claim 1, wherein a bushing through which the optical fiber passes is arranged at the head core, and a plurality of spacers supporting the optical fiber are formed inside the bushing.

13. The optical fiber processing apparatus of claim 12, wherein the actuator includes a stator frame of which a relative location is fixed with respect to the machining head, a moving frame reciprocating linearly with respect to the stator frame, and a motor arranged at the moving frame and rotating the processing rod.

14. The optical fiber processing apparatus of claim 1, wherein the coolant passing hole is connected to the optical fiber proceeding tunnel through the processing rod insertion hole.

15. The optical fiber processing apparatus of claim 14, wherein the actuator includes a stator frame of which a relative location is fixed with respect to the machining head, a moving frame reciprocating linearly with respect to the stator frame, and a motor arranged at the moving frame and rotating the processing rod.

16. The optical fiber processing apparatus of claim 1, wherein the actuator includes a stator frame of which a relative location is fixed with respect to the machining head, a moving frame reciprocating linearly with respect to the stator frame, and a motor arranged at the moving frame and rotating the processing rod.

* * * * *